US012099722B2

(12) United States Patent
Challa et al.

(10) Patent No.: US 12,099,722 B2
(45) Date of Patent: Sep. 24, 2024

(54) RESILIENCY SLO PROTOCOL LAYER

(71) Applicant: Dell Products L.P., Round Rock, TX (US)

(72) Inventors: Narasimha Challa, Hopkinton, MA (US); Igor Achkinazi, Northborough, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 17/975,754

(22) Filed: Oct. 28, 2022

(65) Prior Publication Data

US 2024/0143176 A1    May 2, 2024

(51) Int. Cl.
*G06F 3/06* (2006.01)
(52) U.S. Cl.
CPC .......... *G06F 3/0611* (2013.01); *G06F 3/0665* (2013.01); *G06F 3/067* (2013.01)
(58) Field of Classification Search
CPC ....... G06F 3/0611; G06F 3/0665; G06F 3/067
See application file for complete search history.

(56) References Cited

U.S. PATENT DOCUMENTS

| | | | | |
|---|---|---|---|---|
| 9,100,343 | B1* | 8/2015 | Riordan | H04L 41/40 |
| 2020/0034072 | A1* | 1/2020 | Jreij | G06F 9/5094 |
| 2023/0038522 | A1* | 2/2023 | Sim | H04L 47/80 |

* cited by examiner

*Primary Examiner* — Edward J Dudek, Jr.
(74) *Attorney, Agent, or Firm* — Krishnendu Gupta; Nikhil Patel

(57) ABSTRACT

One or more aspects of the present disclosure relate to dynamically selecting a storage array and corresponding input/output (IO) paths between a host and the storage array. In embodiments, a virtual storage volume (VSV) can be established for a host entity using one or more storage device portions from a plurality of storage arrays. In addition, IO servicing metric parameters can be dynamically measured. The servicing metric parameters can define metrics corresponding to the VSV's assigned ports on each of the storage arrays or network latency between the host and each of the plurality of storage arrays. Further, a primary storage array from the plurality of storage arrays can be selected based on the IO servicing metrics.

14 Claims, 9 Drawing Sheets

RESILIENCY SLO PROTOCOL LAYER

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

In aspects of the present disclosure, a method includes receiving an input/output (IO) workload at a storage array and processing the IO workload according to a resiliency service level objective (SLO) corresponding to each IO request in the IO workload.

In embodiments, the method can further include provisioning the storage array with an application, hardware, and circuitry components based on the resiliency SLO.

In embodiments, the method can further include establishing subnets and physical links between a host machine and the storage array defined by the resiliency SLO, where the host machine and server are on a network corresponding to the storage array.

In embodiments, the method can further include provisioning the storage array by configuring the storage array with components enabling it to satisfy the resiliency SLO's corresponding performance requirements.

In embodiments, the method can further include assigning each storage array's application, hardware, and circuitry components with their corresponding resiliency SLO.

In embodiments, the method can further include establishing a virtual storage volume (VSV) for the host machine using one or more portions of the storage array's storage devices, assigning a logical unit number (LUN) to the VSV, and assigning the LUN with a corresponding resiliency SLO based on the host machine's characteristics or profile.

In embodiments, the method can further include based on the LUN's assigned SLO masking the LUN to one or more ports, establishing a set of subnets and physical links to service IO requests targeting the LUN, and assigning storage array resources to service IO requests targeting the LUN.

In embodiments, the method can further include establishing a retransmit threshold for each of the LUN's subnets or physical links based on the LUN's assigned resiliency SLO, changing each subnet's or physical link's state based on a comparison of their respective actual retransmit values and retransmit thresholds, where each state is 'down' if a given actual transmit value exceeds its corresponding retransmit threshold.

In embodiments, the method can further include performing one or more subnet or physical link mitigation techniques in response to determining a given subnet's or physical link's state is 'down,' defining an operational delay for each down subnet or physical link, and exponentially growing the operational delay upon identifying a retransmit threshold breach for each down subnet or physical link.

In embodiments, the method can further include exponentially decreasing a subnet's or physical link's operational delay during the subnet's or physical link's operational delay for each period the subnet's or physical link's actual retransmit values are below their respective retransmit thresholds.

In aspects of the present disclosure, a system with a processor and memory, in embodiments, the system configured to receive an input/output (IO) workload at a storage array and process the IO workload according to a resiliency service level objective (SLO) corresponding to each IO request in the IO workload.

In embodiments, the system can be further configured to provision the storage array with an application, hardware, and circuitry components based on the resiliency SLO.

In embodiments, the system can be further configured to establish subnets and physical links between a host machine and the storage array defined by the resiliency SLO, where the host machine and server are on a network corresponding to the storage array.

In embodiments, the system can be further configured to configure the storage array with components enabling it to satisfy the resiliency SLO's corresponding performance requirements.

In embodiments, the system can be further configured to assign each storage array's application, hardware, and circuitry components with their corresponding resiliency SLO.

In embodiments, the system can be further configured to establish a virtual storage volume (VSV) for the host machine using one or more portions of the storage array's storage devices, assign a logical unit number (LUN) to the VSV, and assign the LUN with a corresponding resiliency SLO based on the host machine's characteristics or profile.

In embodiments, the system can be further configured to mask the LUN to one or more ports based on the LUN's assigned SLO, establish a set of subnets and physical links to service IO requests targeting the LUN based on the LUN's assigned SLO, and assign storage array resources to service IO requests targeting the LUN based on the LUN's assigned SLO.

In embodiments, the system can be further configured to establish a retransmit threshold for each of the LUN's subnets or physical links based on the LUN's assigned resiliency SLO, change each subnet's or physical link's state based on a comparison of their respective actual retransmit values and retransmit thresholds, where each state is 'down' if a given actual transmit value exceeds its corresponding retransmit threshold.

In embodiments, the system can be further configured to perform one or more subnet or physical link mitigation techniques in response to determining a given subnet's or physical link's state is 'down,' define an operational delay for each down subnet or physical link, and exponentially grow the operational delay upon identifying a retransmit threshold breach for each down subnet or physical link.

In embodiments, the system can be further configured to exponentially decrease a subnet's or physical link's operational delay during the subnet's or physical link's operational delay for each period the subnet's or physical link's actual retransmit values are below their respective retransmit thresholds.

Other technical features are readily apparent to one skilled in the art from the following figures, descriptions, and claims.

BRIEF DESCRIPTION OF THE DRAWINGS

The preceding and other objects, features, and advantages will be apparent from the following more particular descrip

DETAILED DESCRIPTION

A business like a financial or technology corporation can produce large amounts of data and require sharing access to that data among several employees. These companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications.

Generally, a storage array's configuration is based on a service level agreement (SLA), defining service level objectives (SLOs), corresponding service levels (SLs), and the like, as described in FIG. 2 below in greater detail. Specifically, current naïve techniques configure a storage array's physical memory and storage device architecture and related allocation and consumption policies based on the SLA. Accordingly, such storage arrays do not include a physical architecture or related policies related to network-based events that can degrade the storage array's performance.

Embodiments of the present disclosure establish a resiliency SLO, adding a network-based parameter to current naïve SLAs. For example, a resiliency SLO can define properties corresponding to subnets and links between the storage array and a host. Further, embodiments of the present disclosure dynamically establish, modify, or remove subnets based on historical, current, or anticipated network conditions and corresponding input/output (IO) workloads, as described in greater detail herein.

Figure 1:
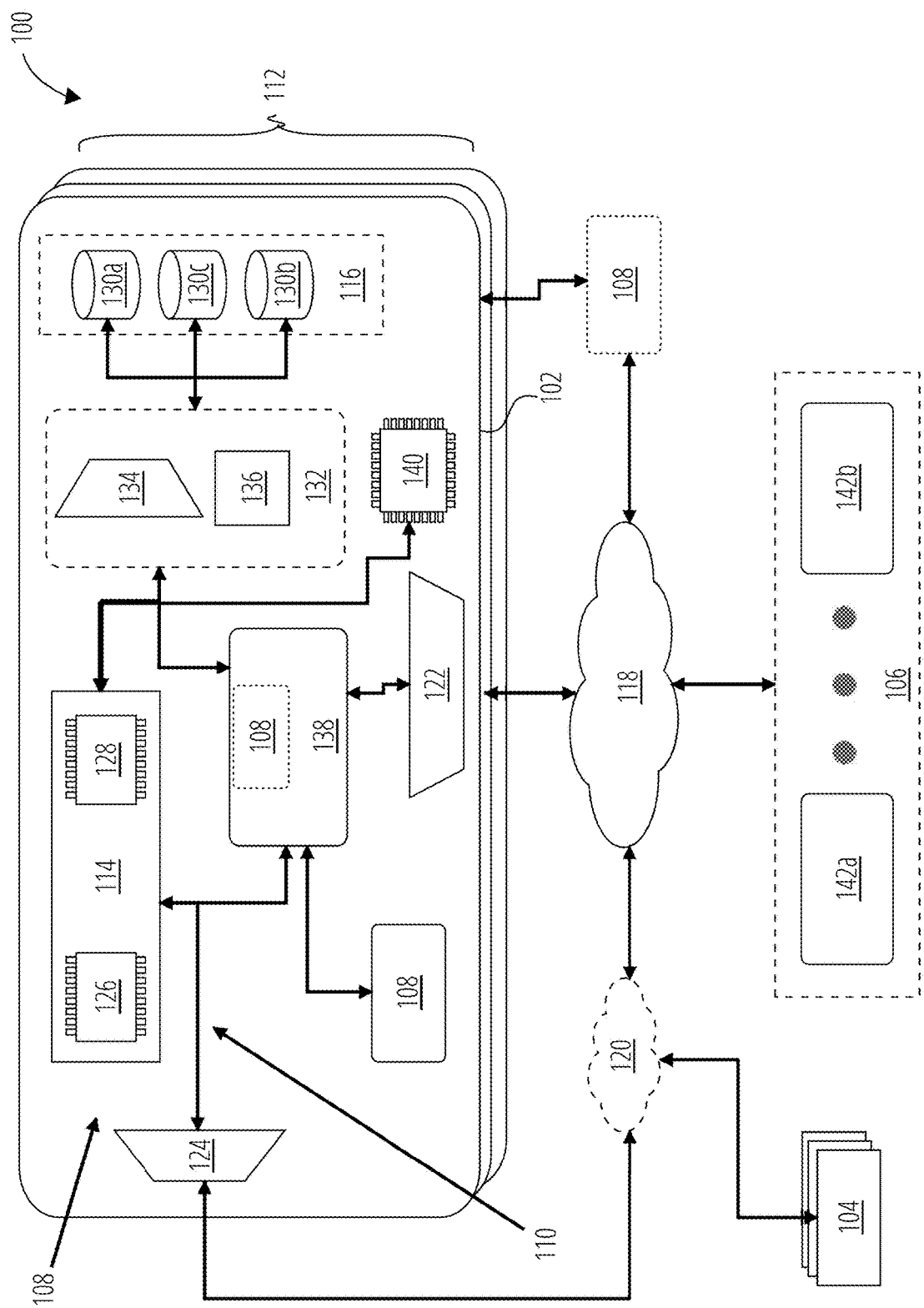
- FIG. 1 shows a distributed network environment in accordance with embodiments of the present disclosure.

Regarding FIG. 1, a distributed network environment 100 can include a storage array 102, a remote system 104, and hosts 106. In embodiments, the storage array 102 can include controllers 108 that perform one or more distributed file storage services. In addition, the storage array 102 can include one or more internal communication channels 110 like Fibre channels, busses, and communication modules that communicatively couple the controllers 108. Further, the distributed network environment 100 can define an array cluster 112 that can include two or more storage arrays, including the storage array 102.

In embodiments, the storage array 102, controllers 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's controllers 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include hosts 106 142*b*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between the hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 126) that can cache IO messages and their respective data payloads. Additionally, the memory 114 can include local memory (LM 128) that stores instructions that the storage array's processors 132 can execute to perform one or more storage-related services. For example, the storage array 102 can have a multiprocessor architecture that can include one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 130a-c. Further, each TDAT can have distinct performance capabilities (e.g., read/write speeds) like hard disk drives (HDDs) and solid-state drives (SSDs).

Further, the HA 122 can direct one or more IOs to an array controller 108 based on their respective request types and metadata. In embodiments, the storage array 102 can include a device interface (DI 132) that manages access to the array's persistent storage 116. For example, the DI 132 can include a device adapter (DA 134) (e.g., storage device controller), flash drive interface 136, and the like that controls access to the array's persistent storage 116 (e.g., storage devices 128a-c).

Likewise, the storage array 102 can include an Enginuity Data Services processor (EDS 138) that can manage access to the array's memory 114. Further, the EDS 138 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 138 can deliver hosts 106 (e.g., hosts 106-b) remote/distributed storage services by virtualizing the storage array's memory/storage resources (memory 114 and persistent storage 116, respectively).

In embodiments, the storage array 102 can also include a controller 108 (e.g., management system controller) that can reside externally from or within the storage array 102 and one or more of its controllers 108. When external from the storage array 102, the controller 108 can communicate with the storage array 102 using any known communication connections. The communications connections can include a serial port, parallel port, network interface card (e.g., Ethernet), etc. Further, the controller 108 can include logic/circuitry that performs one or more storage-related services. For example, the controller 108 can have an architecture designed to manage the storage array's computing, storage, and memory resources as described in greater detail herein.

Figure 2:
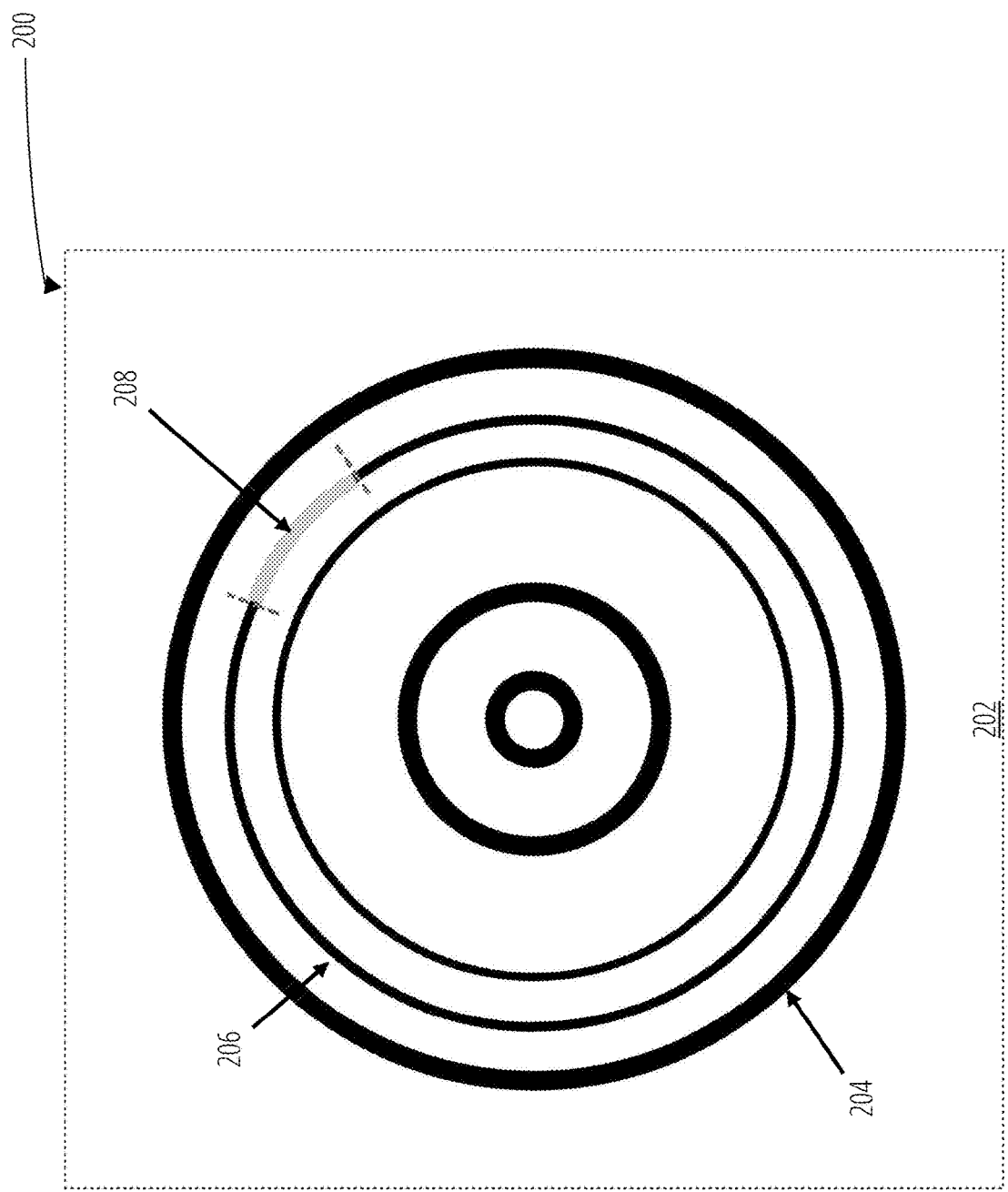
FIG. 2 is a cross-sectional view of a storage device in accordance with embodiments of the present disclosure.

Regarding FIG. 2, the storage array's EDS 138 can virtualize the array's persistent storage 116. Specifically, the EDS 138 can virtualize a storage device 200, which is substantially like one or more of the storage devices 130a-130b. For example, the EDS 138 can provide a host, e.g., host 106, with a virtual storage device (e.g., thin-device (TDEV)) that logically represents one or more of the storage array's physical storage resources or slices/portions thereof (e.g., extents). Further, the EDS 138 can provide each TDEV with a unique identifier (ID) like a target ID (TID). Additionally, EDS 138 can map each TID to its corresponding TDEV using a logical unit number (LUN) (e.g., a pointer to the TDEV). The EDS 138 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 138 can provide each slice/portion with a corresponding logical block address (LBA). Additionally, the EDS 138 can group sets of continuous LBAs to establish one or more extents. Further, the EDS 138 can group a set of extents to establish a virtual storage device (e.g., TDEV). Thus, each TDEV can include extents and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 138 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 138 can establish the hierarchy to include one or more tiers (e.g., subsets of the array's storage and memory) with similar performance capabilities (e.g., response times and uptimes). Thus, the EDS 138 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 138 can define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. In embodiments, the first and second thresholds can correspond to the same threshold.

Figure 3:
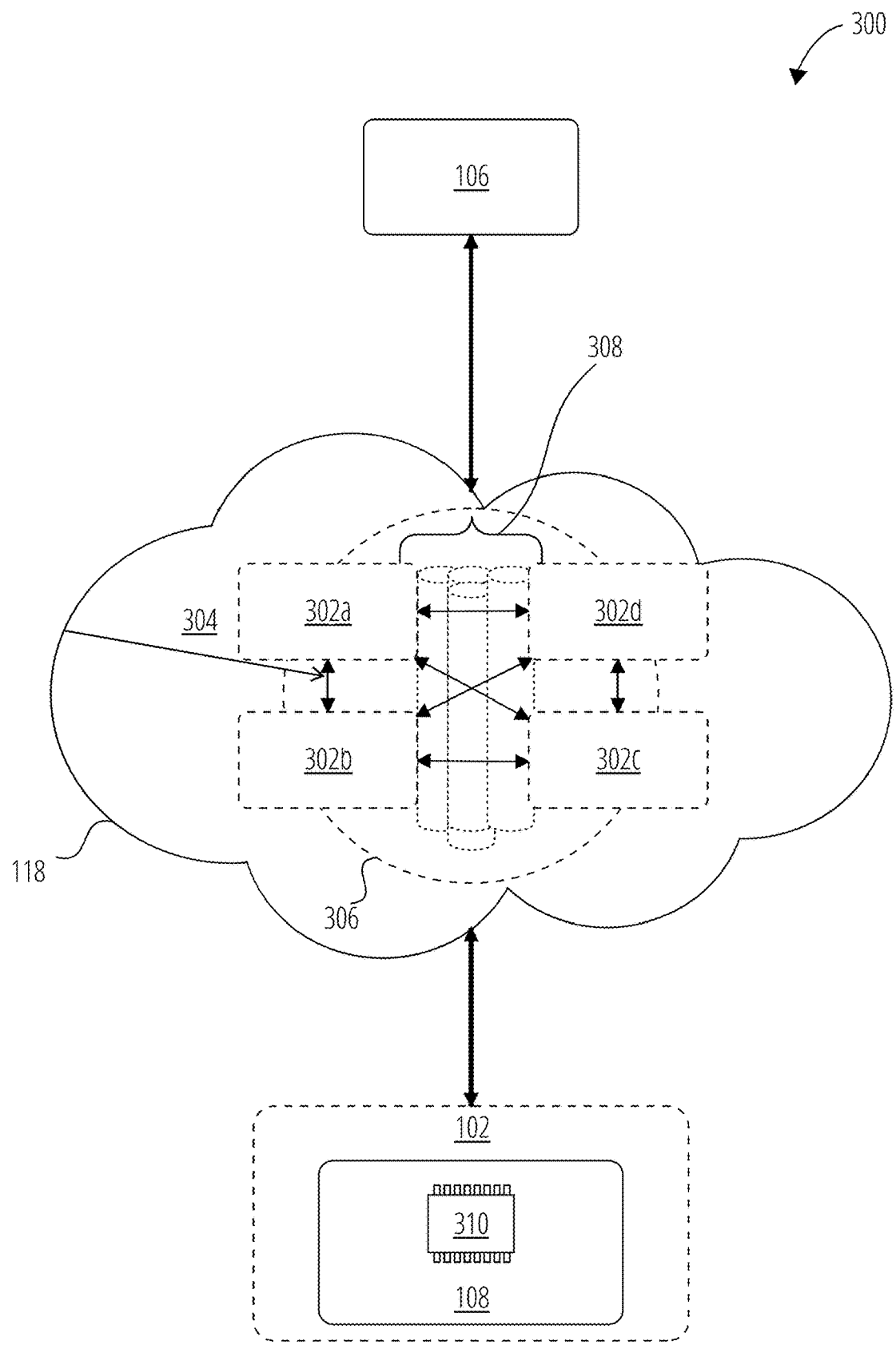
FIG. 3 shows a multipath distributed network environment in accordance with one embodiment.

Regarding FIG. 3, a distributed network environment 300 can include a SAN 118 communicatively coupling devices, such as a storage array 102 and a host 106 (e.g., the storage array 102 and host 106 of FIG. 1). In embodiments, the SAN 118 can include nodes (e.g., network nodes 302a-302d) interconnected with links 304, such as physical network node links (e.g., ethernet cable). Additionally, the nodes can include networking hardware such as computing nodes (e.g., computers), servers, networking hardware, bridges, switches, hubs, and the like. Accordingly, the interconnected nodes can establish information flows between the storage array 102 and host 106 (e.g., networked devices) via the SAN 118. Further, sets of interconnected nodes can define one or more network paths 308, allowing communication protocol-based data exchanges. Specifically, communication protocols define techniques (e.g., rules, syntax, semantics, and the like) by which the nodes and networked devices can exchange messages over a network, like the SAN 118.

In embodiments, the storage array 102 can include a controller 108 that can discover network paths between storage array 102 and host 106 using network path discovery signals. For example, the controller 108 can instruct a HA (e.g., HA 122 of FIG. 1) to transmit network path discovery signals to the host 106. The network path discovery signals can traverse the SAN 118 and generate travel log, identifying the network nodes 302a-302b and links 304 encountered while traveling to the host 106. In addition, the storage array 102 can receive responsive discovery response signals, including corresponding network path discovery signals travel logs, which the controller 108 maintains in memory 310. Accordingly, the controller 108 can maintain, in memory (e.g., memory 310 of FIG. 4), a searchable network data structure using information from the travel logs. For example, the controller 108 can configure the network data structure to represent the SAN's physical architecture or topology and identify network paths 308 between the storage array 102 and host 106. Further, the controller 108 can dynamically determine real-time latencies of the network paths 308 using network latency signals described in greater detail by FIG. 4 below.

In embodiments, the controller 108 can establish subnets 306, defining segmented portions of the SAN 118. Specifically, the controller can establish the subnets using the network nodes 302a-302d corresponding to the network paths 308 between the storage array 102 and hosts 106. As described below, the controller 108 can dynamically allocate subnets 306 to each host's corresponding virtual storage volume.

Figure 4:
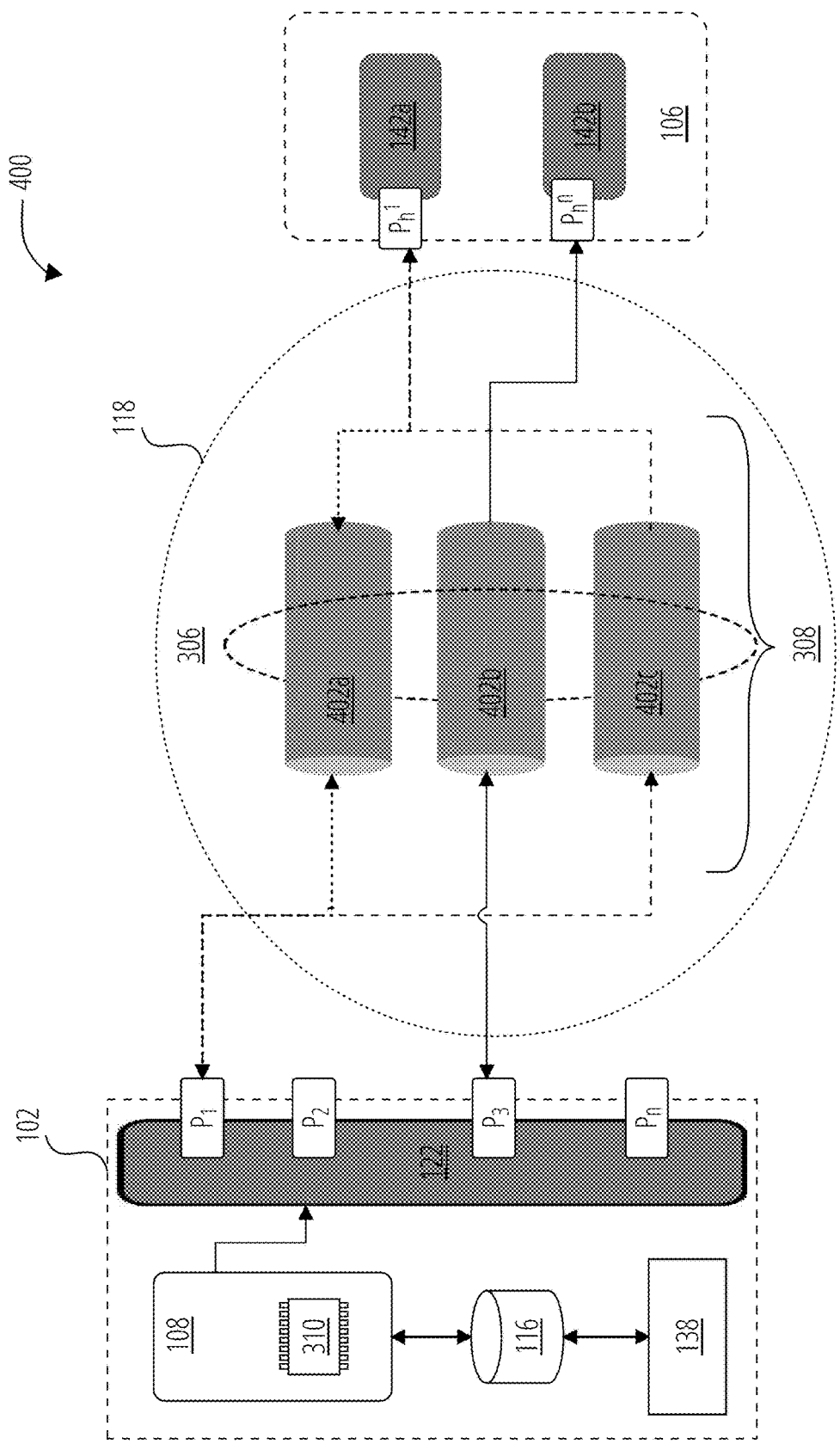
FIG. 4 is a network diagram of a subnet(s) used in a storage area network (SAN) in accordance with embodiments of the present disclosure.

Regarding FIG. 4, a distributed network environment 400 can include a SAN 118 with networked devices. The networked devices include a storage array 102 and hosts 106 (e.g., the storage array 102 and host 106 of FIGS. 1 and 3). Additionally, the storage array 102 includes a controller 108 (e.g., the controller 108 of FIGS. 1 and 3) that establishes subnets 306 as described by FIG. 3.

In embodiments, the subnets 306 can include subnets 402a-402c, each defining corresponding port-to-port network paths 308. For example, the storage array 102 can include a HA 122 (e.g., the HA 122 of FIG. 2) with network ports $P_{1-n}$ with corresponding network addresses. Accordingly, the controller 108 can use a network port's network address as a network path discovery signal's source address. Likewise, the controller 108 can set the network path discovery signal's destination address using one of the network addresses corresponding to host network ports $P_h^{1-n}$. Thus, using port network addresses, the network data structure described above can represent and identify the SAN 118 and network paths 308.

In embodiments, the controller 108 can establish the subnets 306 by grouping segments of the SAN 118 having similar network performance profiles. For example, the performance profiles can include real-time and average latencies of the network paths 308, the number and type of network nodes and links, and the like. Specifically, the controller 108 can maintain network measurement data in its memory 114 using network measurement signals (e.g., using techniques known in the art). Further, the controller 108 can assign the subnets 306 to an SL tier based on their respective performance profiles. (e.g., using techniques similar to those used by the EDS 138 of FIG. 1 to establish the storage or memory hierarchies described in FIG. 2 above).

Further, the controller 108 can assign the storage array's network ports $P_{1-n}$ to an SL tier. Thus, the controller 108 generates port-to-subnet pairs by matching port and subnet SL tiers. Additionally, the controller 108 can mask LUNs to the network ports $P_{1-n}$ based on their respective SL tiers.

In embodiments, the controller 108 can dynamically allocate and reallocate port-to-subnet pairings as described in greater detail by FIGS. 5-9 below.

The following text can include details of one or more methods or flow diagrams in accordance with this disclosure. For simplicity of explanation, each method is depicted and described as a sequence of operations. However, each sequence can be altered without departing from the scope of the present disclosure. Additionally, one or more of each sequence's operations can be performed in parallel, concurrently, or a different sequence. Further, not all illustrated operations are required to implement each method described by this disclosure.

Figure 5:
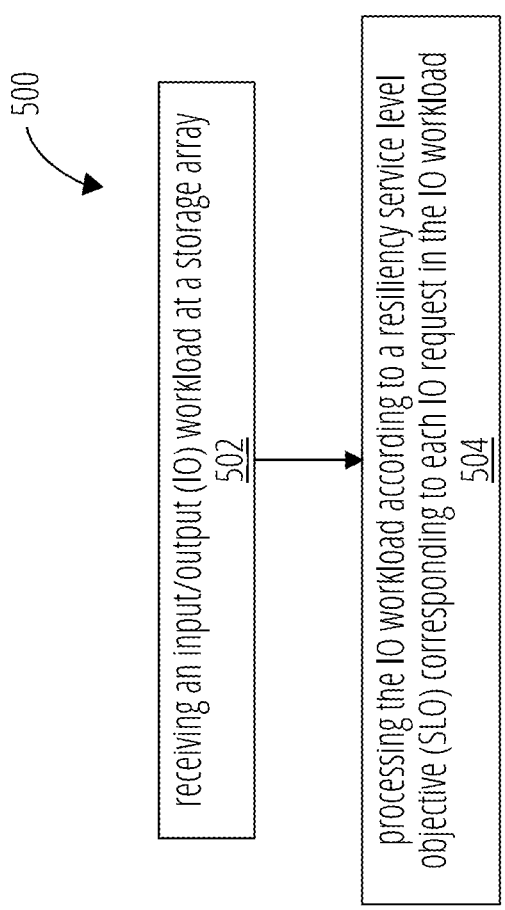
FIG. 5 is a flow diagram of a method for processing input/output (IO) workloads in accordance with embodiments of the present disclosure.

Regarding FIG. 5, a method 500 can include a set of alterable operations for processing input/output (IO) workloads. In embodiments, the method 500 can include receiving an input/output (IO) workload at a storage array at 502. For example, the HA 122 of FIG. 1 can receive an input/output (IO) workload at a storage array.

According to some examples, the method 500 can include processing the IO workload according to a resiliency service level objective (SLO) corresponding to each IO request in the IO workload at 504. For example, the controller 108 of FIG. 1 can process the IO workload according to a resiliency service level objective (SLO) corresponding to each IO request in the IO workload.

Figure 6:
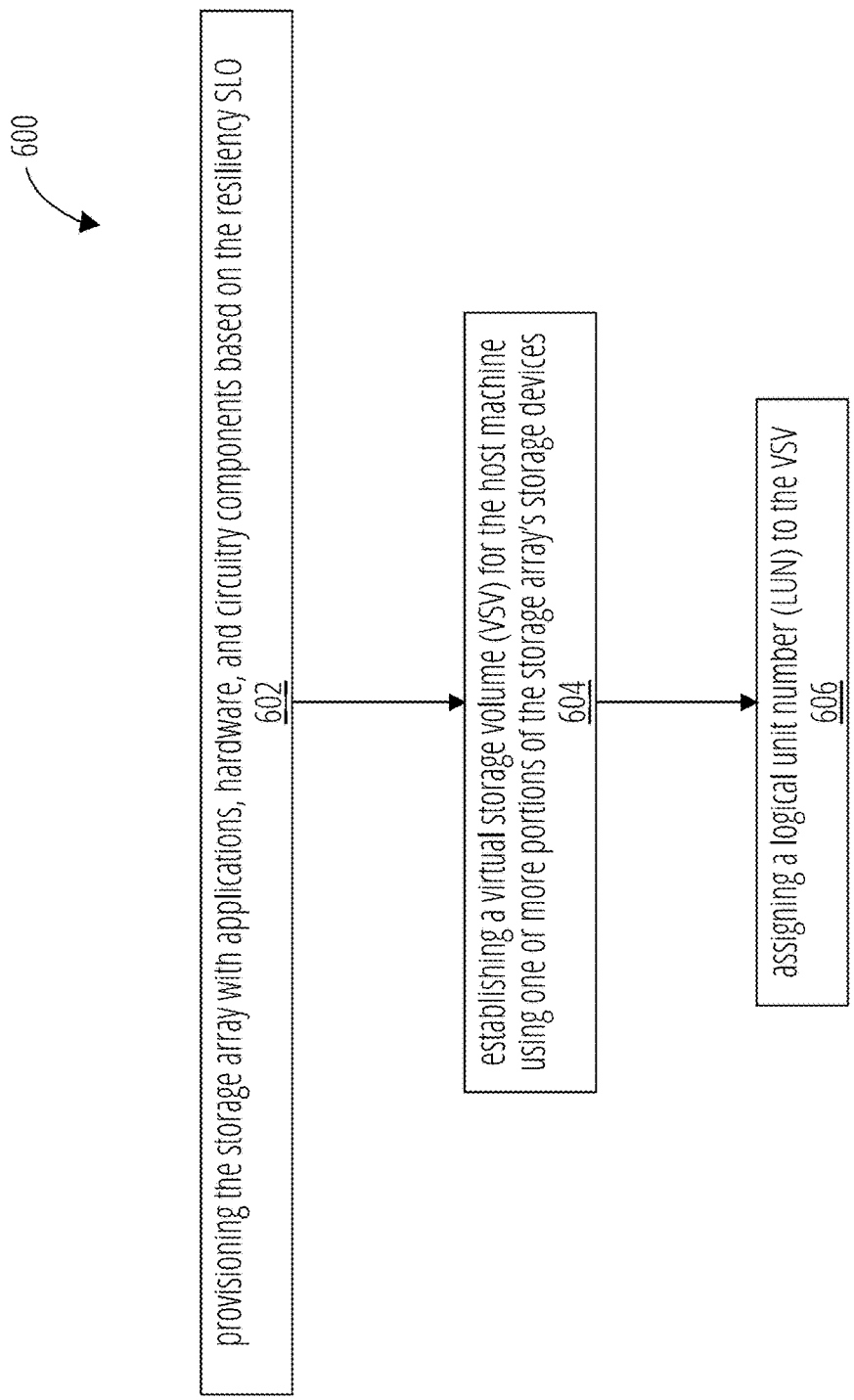
FIG. 6 is a flow diagram of a method for configuring a storage array in accordance with embodiments of the present disclosure.

Regarding FIG. 6, a method 600 can include a set of alterable operations for configuring a storage array.

According to some examples, the method 600 can include provisioning the storage array with applications, hardware, and circuitry components based on the resiliency SLO at 602. For example, the controller 108 of FIG. 1 can provide the storage array with applications, hardware, and circuitry components based on the resiliency SLO. Additionally, the controller 108 can assign the storage array's application, hardware, and circuitry components with their corresponding resiliency SLO.

According to some examples, the method 600 can include establishing a virtual storage volume (VSV) for the host machine using one or more portions of the storage array's storage devices at 604. For example, the EDS 138 of FIG. 1 can establish a virtual storage volume (VSV) for the host machine using one or more portions of the storage array's storage devices.

According to some examples, the method 600 can include assigning a logical unit number (LUN) to the VSV at 606. For example, the EDS 138 of FIG. 1 can assign a logical unit number (LUN) to the VSV. Further, the controller 108 of FIG. 1 can assign the LUN to a corresponding resiliency SLO based on the host machine's characteristics or profile.

Figure 7:
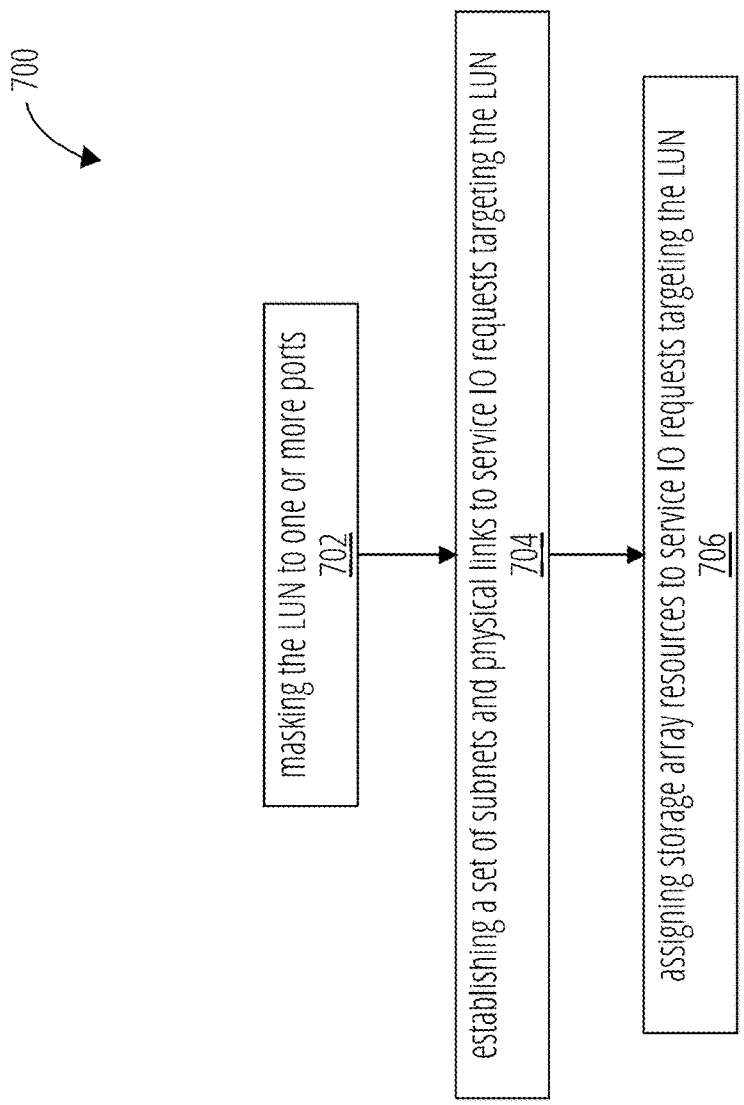
FIG. 7 is a flow diagram of a method for establishing a subnet(s) in a SAN in accordance with embodiments of the present disclosure.

Regarding FIG. 7, a method 700 can include a set of alterable operations for establishing a subnet(s) in a SAN.

According to some examples, the method can include masking the LUN to one or more ports at 702. For example, the controller 108 of FIG. 1 can mask the LUN to one or more ports.

According to some examples, the method can include establishing a set of subnets and physical links to service IO requests targeting the LUN at 704. For example, the controller 108 of FIG. 1 can establish a set of subnets and physical links to service IO requests targeting the LUN.

According to examples, the method can include assigning storage array resources to service IO requests targeting the LUN at 706. For example, the controller 108 of FIG. 1 can assign storage array resources to service IO requests targeting the LUN.

Figure 8:
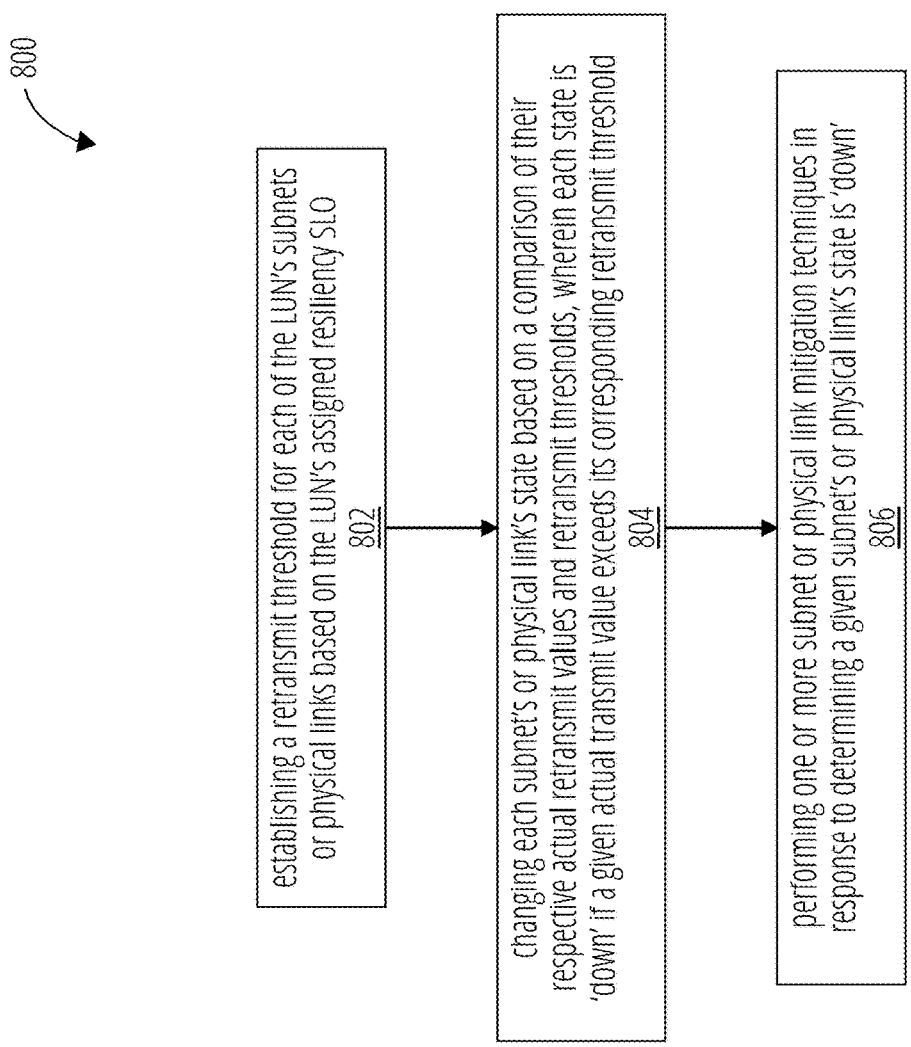
FIG. 8 is a flow diagram of a method for establishing subnet states in accordance with embodiments of the present disclosure.

Regarding FIG. 8, a method 800 can include a set of alterable operations for establishing subnet states.

According to some examples, the method can include establishing a retransmit threshold for each of the LUN's subnets or physical links based on the LUN's assigned resiliency SLO at 802. For example, the controller 108 of FIG. 1 can establish a retransmit threshold for each of the LUN's subnets or physical links based on the LUN's assigned resiliency SLO.

According to some examples, the method can include changing each subnet's or physical link's state based on a comparison of their respective actual retransmit values and retransmit thresholds, wherein each state is 'down' if a given actual transmit value exceeds its corresponding retransmit threshold at 804. For example, the controller 108 of FIG. 1 can change each subnet's or physical link's state based on a comparison of their respective actual retransmit values and retransmit thresholds, wherein each state is 'down' if a given actual transmit value exceeds its corresponding retransmit threshold.

According to some examples, the method can include performing one or more subnet or physical link mitigation techniques in response to determining a given subnet's or physical link's state is 'down' at 806. For example, the controller 108 of FIG. 1 can perform one or more subnet or physical link mitigation techniques in response to determining a given subnet's or physical link's state is 'down.'

Figure 9:
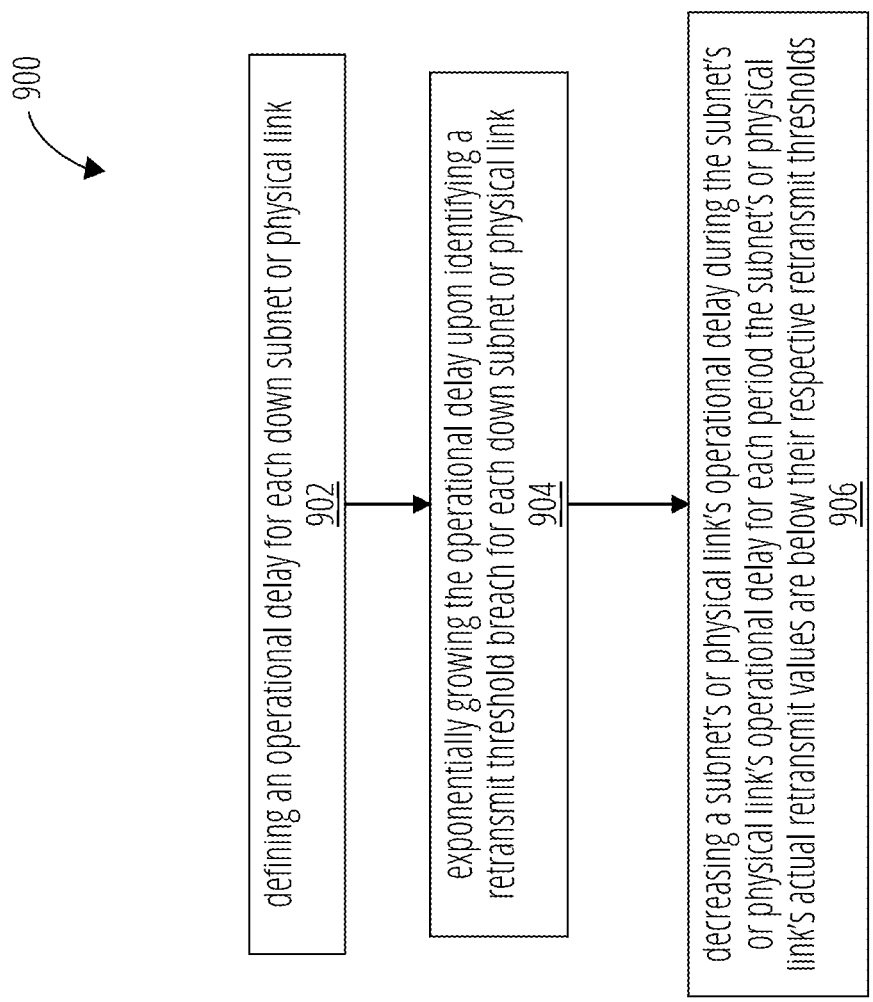
FIG. 9 is a flow diagram of a method for determining an operational delay of a subnet(s) in accordance with embodiments of the present disclosure.

Regarding FIG. 9, a method 900 can include a set of alterable operations for determining an operational delay of a subnet(s).

According to some examples, the method can include defining an operational delay for each down subnet or physical link at 902.

According to some examples, the method can include exponentially growing the operational delay upon identifying a retransmit threshold breach for each down subnet or physical link at 904.

According to some examples, the method can include decreasing a subnet's or physical link's operational delay during the subnet's or physical link's operational delay for each period the subnet's or physical link's actual retransmit values are below their respective retransmit thresholds at 906.

Further, each operation of the methods described above can include any combination of techniques implemented by the embodiments described herein. Additionally, one or more of the storage array's controllers 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device can include, for example, a computer (e.g., desktop computer, laptop computer) with a world wide web browser (e.g., Microsoft® Internet Explorer® and Mozilla®). The mobile computing device can include, for example, a Blackberry®.

Comprise, include, or plural forms of each are open-ended, include the listed parts, and contain additional unlisted elements. Unless explicitly disclaimed, the term 'or' is open-ended and can include one or more of the listed parts, items, elements, and combinations thereof.

What is claimed is:

1. A method comprising:
receiving an input/output (IO) workload at a storage array;
processing the IO workload according to a resiliency service level objective (SLO) corresponding to each IO request in the IO workload;
establishing a number of subnets and physical links between a host machine and the storage array defined by the resiliency SLO, wherein the host machine and server are on a network corresponding to the storage array;
establishing a virtual storage volume (VSV) for the host machine using one or more portions of the storage array's storage devices;
assigning a logical unit number (LUN) to the VSV;
assigning the LUN with a corresponding resiliency SLO based on the host machine's characteristics or profile;
establishing a retransmit threshold for each of the LUN's subnets or physical links based on the LUN's assigned resiliency SLO; and
changing each subnet's or physical link's state based on a comparison of their respective actual retransmit values and retransmit thresholds, wherein each state is 'down' if a given actual transmit value exceeds its corresponding retransmit threshold.

2. The method of claim 1, further comprising:
provisioning the storage array with application, hardware, and circuitry components based on the resiliency SLO.

3. The method of claim 2, further comprising:
configuring the storage array with components enabling it to satisfy the resiliency SLO's corresponding performance requirements.

4. The method of claim 2, further comprising:
assigning each of the storage array's application, hardware, and circuitry components with their corresponding resiliency SLO.

5. The method of claim 1, further comprising:
based on the LUN's assigned SLO:
 masking the LUN to one or more ports,
 establishing a set of subnets and physical links to service IO requests targeting the LUN, and
 assigning storage array resources to service IO requests targeting the LUN.

6. The method of claim 1, further comprising:
performing one or more subnet or physical link mitigation techniques in response to determining a given subnet's or physical link's state is 'down';
defining an operational delay for each down subnet or physical link; and
exponentially growing the operational delay upon identifying a retransmit threshold breach for each down subnet or physical link.

7. The method of claim 6, further comprising:
exponentially decreasing a subnet's or physical link's operational delay during the subnet's or physical link's operational delay for each period the subnet's or physical link's actual retransmit values are below their respective retransmit thresholds.

8. A system with a processor and memory, the system configured to:
receive an input/output (IO) workload at a storage array;
process the IO workload according to a resiliency service level objective (SLO) corresponding to each IO request in the IO workload;
establish a number of subnets and physical links between a host machine and the storage array defined by the resiliency SLO, wherein the host machine and server are on a network corresponding to the storage array;
establish a virtual storage volume (VSV) for the host machine using one or more portions of the storage array's storage devices;
assign a logical unit number (LUN) to the VSV;
assign the LUN with a corresponding resiliency SLO based on the host machine's characteristics or profile;
establish a retransmit threshold for each of the LUN's subnets or physical links based on the LUN's assigned resiliency SLO; and
change each subnet's or physical link's state based on a comparison of their respective actual retransmit values and retransmit thresholds, wherein each state is 'down' if a given actual transmit value exceeds its corresponding retransmit threshold.

9. The system of claim 8, further configured to:
provision the storage array with application, hardware, and circuitry components based on the resiliency SLO.

10. The system of claim 9, further configured to:
configure the storage array with components enabling it to satisfy the resiliency SLO's corresponding performance requirements.

11. The system of claim 9, further configured to:
assign each of the storage array's application, hardware, and circuitry components with their corresponding resiliency SLO.

12. The system of claim 8, further configured to:
based on the LUN's assigned SLO:
- mask the LUN to one or more ports,
- establish a set of subnets and physical links to service IO requests targeting the LUN, and
- assign storage array resources to service IO requests targeting the LUN.

13. The system of claim 8, further configured to:
perform one or more subnet or physical link mitigation techniques in response to determining a given subnet's or physical link's state is 'down';

define an operational delay for each down subnet or physical link; and exponentially grow the operational delay upon identifying a retransmit threshold breach for each down subnet or physical link.

14. The system of claim 13, further configured to:
exponentially decrease a subnet's or physical link's operational delay during the subnet's or physical link's operational delay for each period the subnet's or physical link's actual retransmit values are below their respective retransmit thresholds.

* * * * *